(12) United States Patent
Tian et al.

(10) Patent No.: US 7,751,508 B2
(45) Date of Patent: Jul. 6, 2010

(54) MULTI-RESOLUTION FREQUENCY TRACKING LOOP SYSTEM AND METHOD

(75) Inventors: Bin Tian, San Diego, CA (US); Judd Erlenbach, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 1541 days.

(21) Appl. No.: 10/309,545

(22) Filed: Dec. 3, 2002

(65) Prior Publication Data

US 2004/0105513 A1   Jun. 3, 2004

(51) Int. Cl.
*H04L 27/06* (2006.01)

(52) U.S. Cl. ........................................ 375/344

(58) Field of Classification Search ............. 375/293, 375/294, 316, 327, 344, 354, 362, 364, 373, 375/374, 375, 376; 370/503, 520, 508–514; 327/156–160, 141, 147, 148, 154; 455/182.1, 455/192.1
See application file for complete search history.

(56) References Cited

U.S. PATENT DOCUMENTS

| 5,764,687 A | * | 6/1998 | Easton .................... 375/147 |
| 6,134,260 A | * | 10/2000 | Bottomley et al. .......... 375/130 |
| 6,839,388 B2 | * | 1/2005 | Vaidyanathan ............. 375/326 |

* cited by examiner

*Primary Examiner*—Chieh M Fan
*Assistant Examiner*—Jaison Joseph
(74) *Attorney, Agent, or Firm*—Ashish L. Patel

(57) ABSTRACT

A system and method for determining a frequency correction for a received signal having a transmission frequency, including first and second frequency error tracking loops where the first tracking loop corrects frequency errors over a maximum range of frequencies and the second frequency tracking loop corrects frequency errors that are multiples of the maximum range of frequencies.

12 Claims, 5 Drawing Sheets

MULTI-RESOLUTION FREQUENCY TRACKING LOOP SYSTEM AND METHOD

BACKGROUND

I. Field of the Invention

The invention relates to frequency tracking methods and apparatus, in particular, multiple loop based frequency tracking methods and apparatus.

II. Description of the Related Art

Frequency tracking apparatus and methods commonly must balance a large pull-in range against small, steady-state frequency errors. To limit/reduce steady state errors, some apparatus and methods sequentially employ a large pull-in range tracking loop and then an accurate fast-tracking frequency loop. These apparatus and methods in practice have limitations including convergence and sequential switching control. Thus, a need exists for frequency tracking apparatus and methods that may efficiently pull in large frequency errors while having a small steady state frequency error.

SUMMARY

A method and apparatus is disclosed for determining a frequency correction for a received signal having a transmission frequency. A first frequency correction is determined for the received signal where the first tracking correction is characterized by an accurate and fast tracking ability, but a limited pull-in range. A second frequency correction is determined for the received signal where the second frequency correction is characterized by a large pull-in range, but limited tracking ability. The first frequency correction and the second frequency correction are then summed to determine the frequency correction for the transmission frequency.

In one embodiment, the received signal may include tracking data. In this embodiment, the first frequency correction may be determined based on the tracking data. Further, the second frequency correction may be determined based on the tracking data. The tracking data may include pilot data and the received signal may include a plurality of time slots. In addition, each time slot of the plurality of time slots may include pilot data. In one embodiment, the received signal is a modulated signal. In this embodiment, the received signal transmission frequency may be adjusted based on the frequency correction and the received signal may be demodulated based on the adjusted transmission frequency.

BRIEF DESCRIPTION OF THE DRAWINGS

The features, objects, and advantages of various embodiments of the present invention will become more apparent from the detailed description set forth below when taken in conjunction with the drawings in which like reference characters identify correspondingly throughout and wherein.

DETAILED DESCRIPTION

Figure 1:
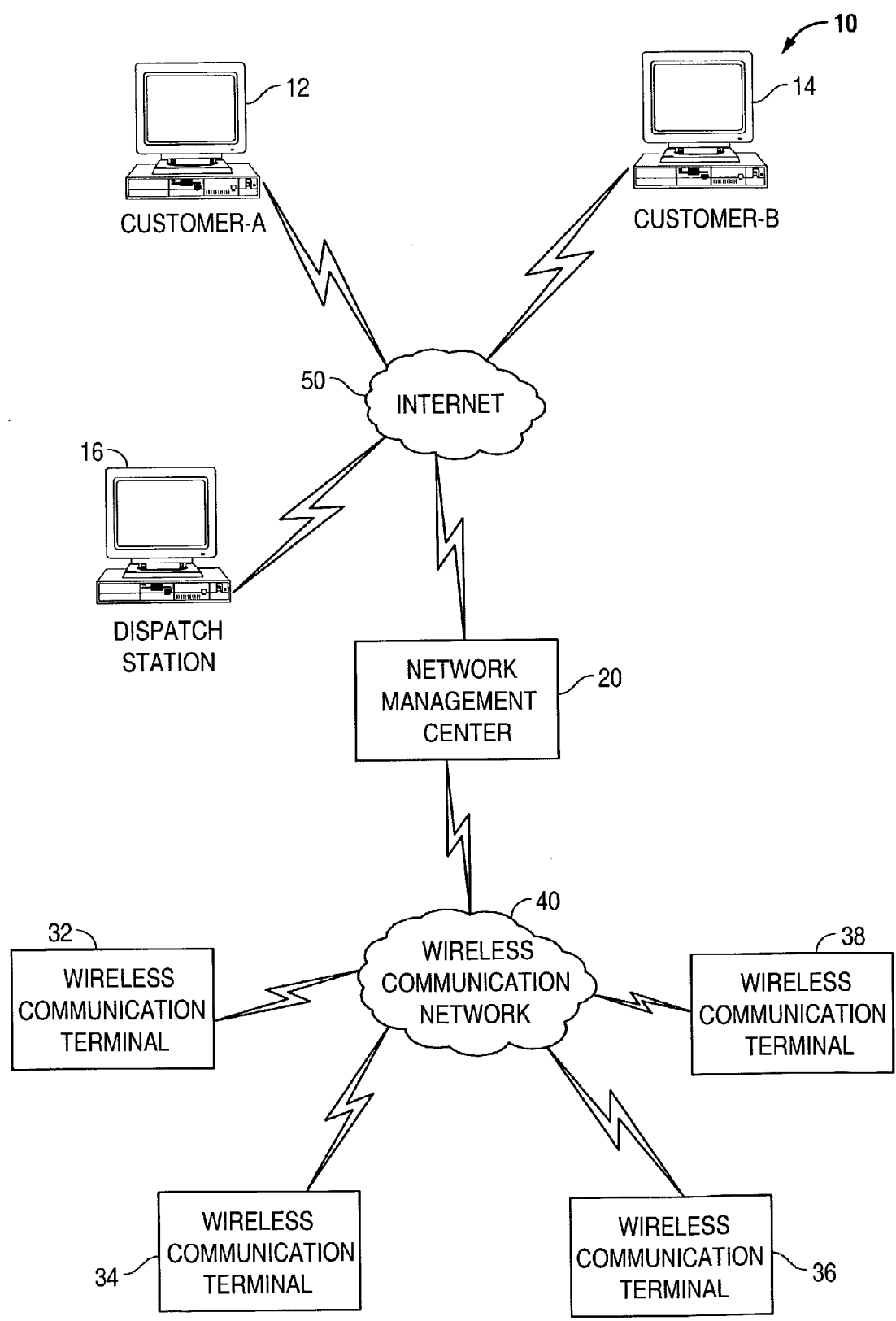
FIG. 1 is an illustration of mobile communication system architecture in which the multiple loop based frequency tracking methods and apparatus may be employed.

FIG. 1 is a block diagram of an exemplary mobile communications architecture 10 in which the multiple loop based frequency tracking methods and apparatus may be employed. The architecture 10 includes a network management center ("NMC") 20 coupled to a plurality of wireless communication terminals ("WCTs") 32, 34, 36, and 38 via a wireless communication network 40. The wireless communication network 40 may comprise a satellite or terrestrial communication system, for example, a cellular communication system or a CDPD communication system A WCT may be mounted in a vehicle or other mobile device, or it may be mounted at a fixed location remotely located from NMC 20, optimally located within the operational boundaries of the wireless communication network 40.

The NMC 20 may also be coupled to one or more customer systems, shown as customers 12 and 14, and/or a dispatch station 16. The NMC 20 may be coupled to the customer systems 12, 14 and dispatch station 16 by dialup connection, Internet connection 50, or direct connection (local area network), or other suitable communication system including a wireless communication system. The NMC 20 may be coupled to the wireless communication network 40 via plain old telephone service (POTS), via a data network such as the Internet, through dedicated communication lines such as a T1 or T3 line, or wirelessly. In another embodiment, the NMC 20 is co-located with at least a portion of the wireless communication network 40. For example, NMC 20 could be co-located with a satellite transmitter. The communication link between the NMC 20 to WCTs is commonly referred to as a forward link, while signals from WCTs to the NMC 20 are sent on a reverse link. Where a WCT is located within a vehicle, data communicated on the forward link may include geographical location information, delivery and vehicle status, encoded voice communications from a WCT and directions, instructions, road status information, and voice communications from the NMC 20. The NMC 20 may receive similar information from a WCT and forward the information to a customer (12, 14) and/or dispatcher (via dispatch terminal 16).

Figure 3:
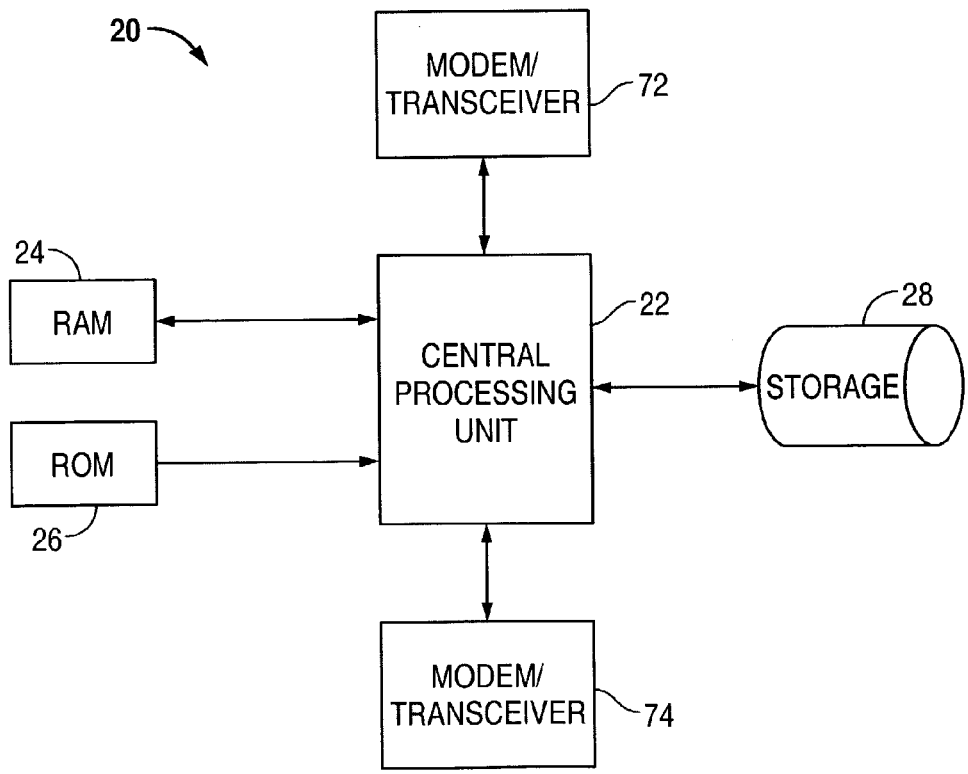
FIG. 3 illustrates a network management center ("NMC") in functional block diagram format that may be employed in the architecture shown in FIG. 1.

A block diagram of an typical NMC 20 is shown in FIG. 3. The NMC 20 includes a CPU 22, a RAM 24, a ROM 26, a storage unit 28, a first modem/transceiver 72, and a second modem/transceiver 74. The first modem/transceiver 72 may couple the NMC 20 to internet 50. The modem/transceiver 72 may be an Ethernet modem connecting the NMC to a local network or Internet. The second modem/transceiver 74 couples the NMC 20 to the wireless communication network 40 and allows bi-directional communication with one or more WCTs. The CPU 22 may direct communications between the first and second modem 72 and 74 for messages between the customer terminals 12, 14 and dispatch terminal 14 and one or more WCTs 32, 34, 36 and 38. The ROM 26 may store program instructions to be executed by the CPU 22 to perform the above and below described operations. The RAM 24 may be used to store temporary program information, received data, and message. The storage unit 28 may be any unit capable of data storage and may be used to store messages and other information.

Figure 2:
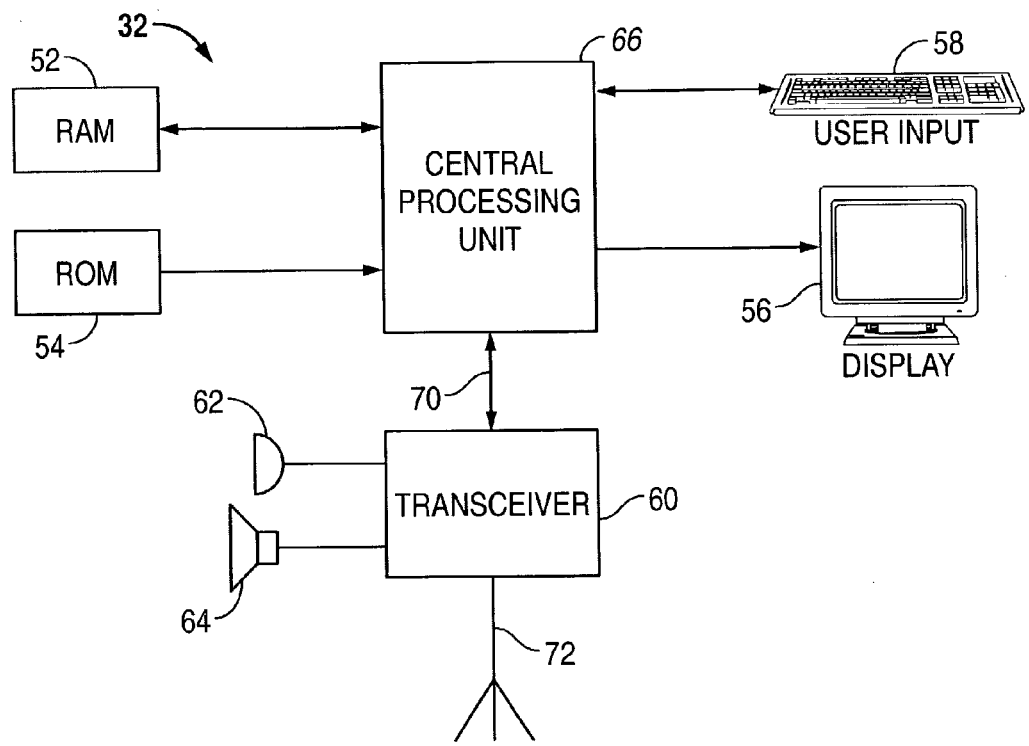
FIG. 2 illustrates a wireless communications terminal ("WCT") in functional block diagram format that may be employed in the architecture shown in FIG. 1.

A block diagram of an exemplary WCT 32, 34, 36, or 38 is shown in FIG. 2. The WCT 32 includes a central processing unit ("CPU") 66, a random access memory ("RAM") 52, a read only memory ("ROM") 54, a display 56, a user input device 58, a transceiver 60, a microphone 62, a speaker 64, and an antenna 72. The ROM 54 is coupled to the CPU 66 and stores the program instructions to be executed by the CPU 66. The RAM 52 is also coupled to the CPU 66 and stores temporary program data. The user-input device 58 may include a keypad, a touch pad screen, a track ball, or other input device. The user employs the input device 58 to navigate through menus, to generate messages, request route information, and other functions. The display 56 is an output device such as a CRT, a LCD, or other user perceptible device. The user may employ the display 56 to read decoded messages or other data transmitted from a customer 12 or 14 or other unit (WCT 32) via the wireless network 40. The CPU 66 may comprise an Intel™ 80186 processor in one embodiment.

When provided, the microphone 62 and speaker 64 may be incorporated in a handset coupled to the transceiver 60. The microphone 62 and speaker 64 may also be more physically separated to enable hands free communication with the user of the WCT 32. In this mode, the transceiver 60 may include voice activation circuitry that may convert voice into data transmitted to the CPU 66 for processing. The data is transmitted to CPU 66 via a serial bus 70. The transceiver 60 includes the instruction set necessary to communicate data and voice signals over the wireless communication network 40. In one embodiment, the transceiver 60 supports code division multiple access ("CDMA") protocols and the wireless network is a CDMA based network that supports data and voice signals. The transceiver 60 is coupled to the antenna 72 for communicating signals with the wireless communication network 40. When a data signal is received by the transceiver 60, the data is transferred to the CPU 66 via the serial bus 70. The data may include text messages, traffic updates, suggested changes to road navigation, destination, multiple destination order priority, weather, accident, construction or other road network status data, or other information. The data may also include software updates for the unit. The transceiver 60 may be capable of receiving position and velocity vectors signals such as QASPR, GPS, DGPS, and E-911 signals, among others.

In order to demodulate messages received on the forward link, the transceiver 60 must accurately track the forward link transmission frequency for the modulated signal. In architecture 10, the forward link transmission frequency may vary due to WCT 32 motion and other factors. For example, movement of a WCT at a speed of 100 miles per hour may introduce a frequency error on the order of 0.15 part per million ("ppm") and the acceleration/deceleration of a WCT at 10 miles per hour per second (mph/s) may cause a frequency change rate on the order of 0.015 parts per million per second ("ppm/s"). In addition, each WCT transceiver 60 includes a local oscillator ("LO") (not shown) used in part to demodulate/modulate forward/reverse link signals. LO error may introduce a long term frequency error on the order of 8 ppm and a short term frequency change rate on the order of 1 part per billon per second ("ppb/s"). For a forward link transmission frequency of about 12 GHz, the LO long term frequency error may be on the order of 96 KHz. In order to coherently demodulate a received (modulated) signal, a frequency error on the order of 10 Hz is commonly required. In the architecture 10, the present invention is employed in the transceiver 60 to track the received signal frequency (effectively reducing the LO frequency error and motion variation) to a level that enables coherent demodulation.

Figure 4A:
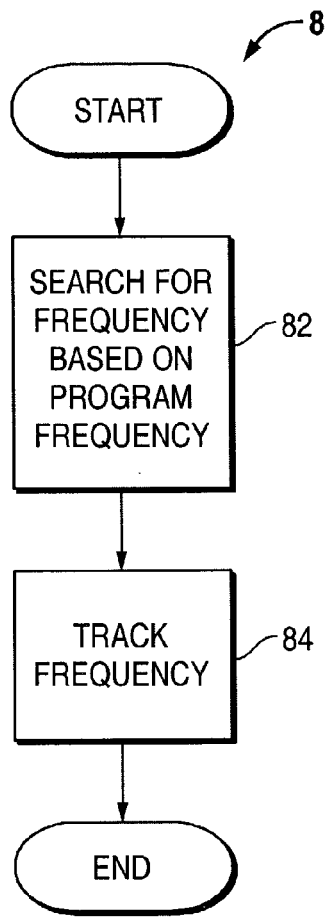
FIG. 4A illustrates an algorithm for determining the demodulation frequency for a received modulated signal in accordance with one embodiment.

The process 80 shown in FIG. 4A is used to reduce the received signal frequency tracking error to an acceptable level (in an exemplary embodiment to a level that permits coherent demodulation of the received signal). The process 80 first searches for the transmitted signal (at step 82) based on the predetermined forward link transmission frequency. Using known techniques such as energy maximization, step 82 reduces large frequency tracking errors to intermediate levels (e.g., from 96 KHz to about 4 KHz range, in one exemplary embodiment). Then process 80 employs frequency tracking (step 84) to reduce the frequency tracking error to an acceptable level (for demodulation).

Figure 4B:
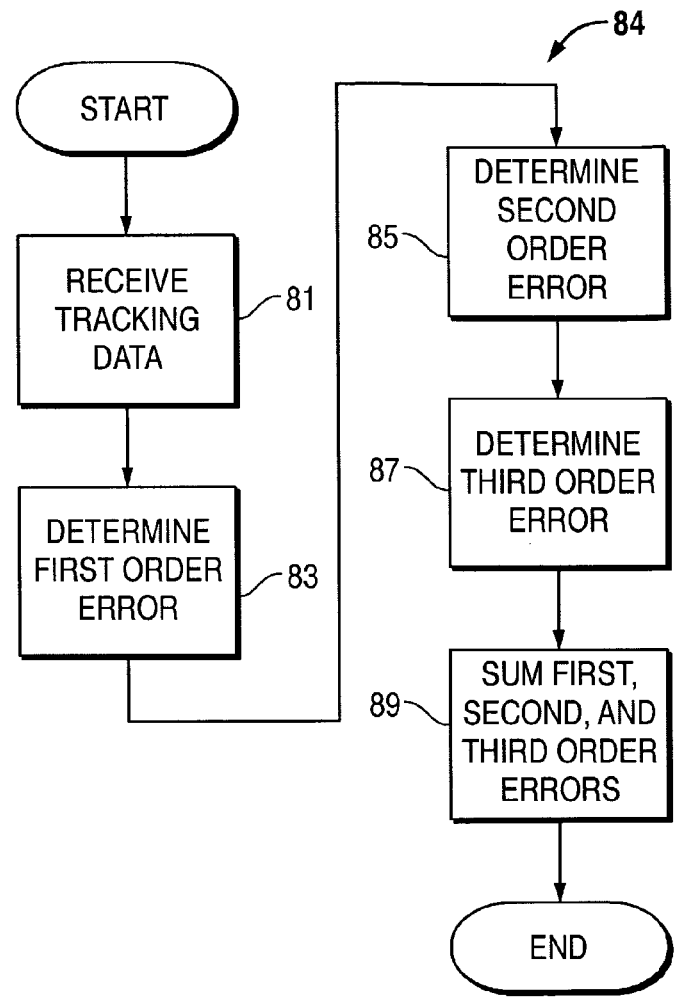
FIG. 4B illustrates an algorithm for tracking the demodulation frequency for a received modulated signal in accordance with one embodiment.

FIG. 4B is a flow diagram of one embodiment of a frequency tracking process 84 that uses three independent error correction processes in parallel. Other embodiments may use a fewer number or a greater number of independent error correction processes. In addition, the error correction processes may occur in parallel with each other, as shown in FIG. 4B, or it may occur sequentially. In process 84, tracking data is collected from the received signal (step 81) and used to determine first, second, and third tracking error corrections (steps 83, 85, 87). These error corrections are summed (step 89) and may be used to correct for the received signal's frequency variations. In a preferred embodiment, the second error correction is a multiple of the maximum pull-range of the first error correction range, e.g., if the first error correction has a pull-range of +/−300 Hz, the second error correction would comprise multiples of +/−600 Hz. In this embodiment, the third error correction comprises a multiple of the maximum pull-in range of the second error correction. The term "pull-in range" refers to a range of frequencies that a frequency correction loop can correct. Generally, one frequency correction loop will have a small pull-in range, but able to track fast frequency changes. Another frequency correction loop will have a large pull-in range (i.e., multiples of the frequency correction loop having the small pull-in range), but not able to track fast frequency changes.

Figure 5:
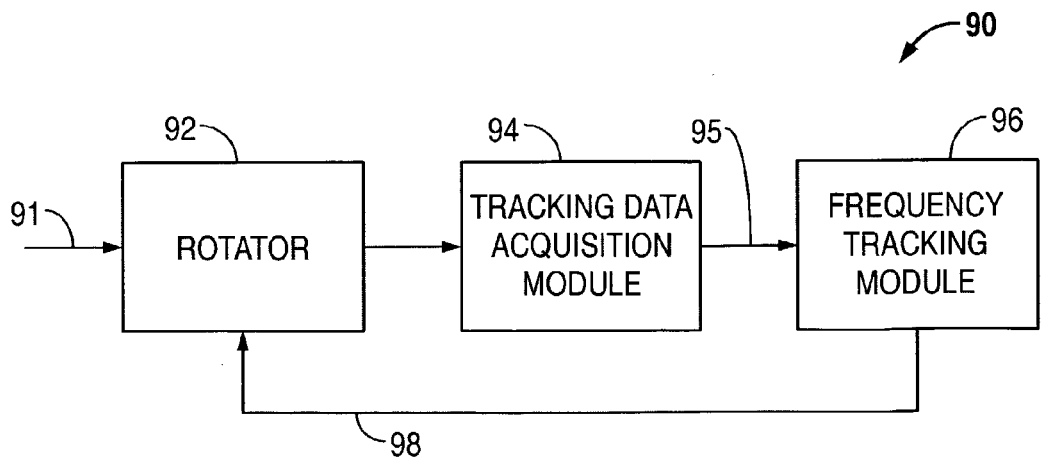
FIG. 5 is a block diagram of apparatus that determines the demodulation frequency for a received modulated signal in accordance with one embodiment.

FIG. 5 is a functional block diagram of one embodiment of an apparatus 90 for determining/tracking the demodulation frequency of a received modulated signal having tracking data. The apparatus 90 includes a rotator 92, a frequency tracking data acquisition module 94, and a frequency tracking module 96. The rotator 92 processes the received signal 91 based on the expected, predetermined receive signal frequency. The tracking data acquisition module locates and processes tracking data of the received signal to generate tracking data signal(s) 95. The frequency tracking module 96 uses the tracking data signal(s) 95 to generate one or more frequency correction signals 98. The rotator adjusts the receive frequency based on the frequency correction signal(s) 98. In one embodiment, the frequency tracking loop module 96 performs the process 84 shown in FIG. 4B. An exemplary embodiment of the present invention is presented with reference to FIGS. 6A to 6C.

Figure 6A:
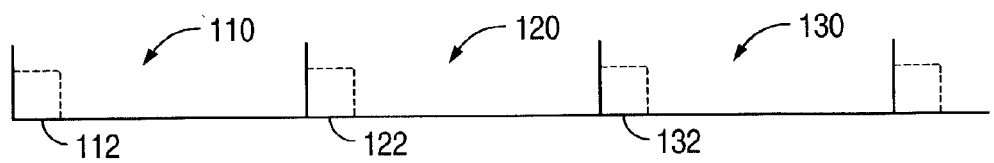
FIGS. 6A to 6C are illustrations of receive data slots including tracking data that may be employed in one embodiment.
Figure 6B:
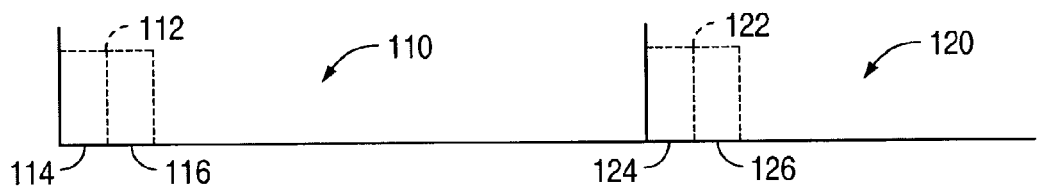
Figure 6C:
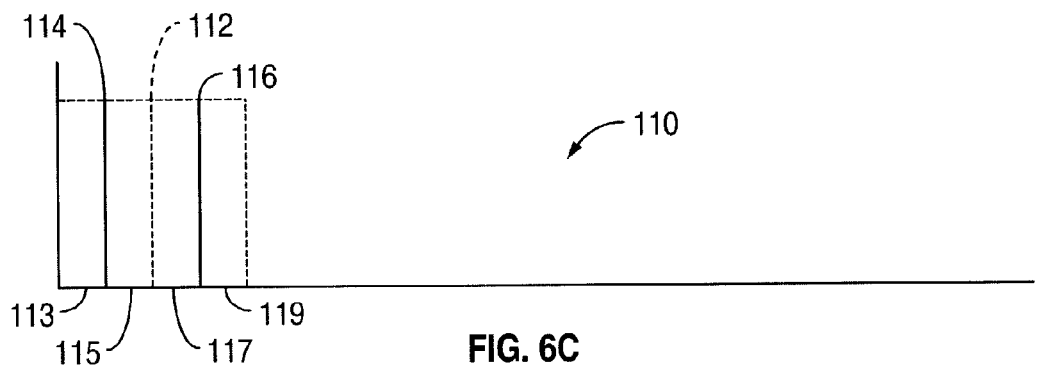

FIGS. 6A to 6C are illustrations of receive data slots including tracking data. In FIG. 6A, there are 600 time slots per second (110, 120, 130), each time slot having 4096 chips, and tracking data comprising 384 chips at the start of each time slot (112, 122, 132) (for a total of 2.4576 Mchips/sec). In one embodiment, the tracking data comprise pilot data, $Pl_k$ where k represents the slot number. Then $P_k$ is equal to $$\sum_{i=0}^{383} Pl_k(i) = A_k e^{j\theta_k}.$$

Based on this, the first tracking data module/process determines $B=\text{Im}(P_{k+1}P^*_k) \approx A_k A_{k+1} \Delta\theta$. Accordingly, B represents the first frequency error correction. In the configuration, B has a pull-in range of ±300 Hz. In a preferred embodiment, the second correction provides frequency error corrections equal to n*600 Hz, where n comprises an integer representing the number of 600 Hz intervals needed to correct a received signal to a target frequency, as explained in more detail below.

FIG. 6B is an illustration of an exemplary slot configuration that may be used for determining n in accordance with the present invention. In this configuration, each pilot burst 112, 122, 132 of a slot 110, 120, 130 is divided into two sub-pilots 114, 116 (124, 126). Each sub-pilot burst has 192 chips. The second frequency error correction may be determined from a first and second sub-pilot burst in each slot. In particular $C=\text{Im}(H_{1,k}H^*_{2,k})$ where $H_{1,k}$ is the first sub-pilot burst of slot k and $H_{2,k}$ is the second sub-pilot burst of slot k. Then n is the closest integer of C/600 Hz. Then the error correction for an embodiment having two tracking loops is B+n*600 Hz. It is noted that second error correction loop has a pull-in range of ±6.4 KHz. FIG. 6C is an illustration wherein each pilot burst 112 is divided into four sub-pilots 113, 115, 117, and 119. In this configuration a third error loop may be used, able to correct for frequencies on the order of m*12.8 KHz, i.e., a multiple of the second pull-in range.

Figure 7:
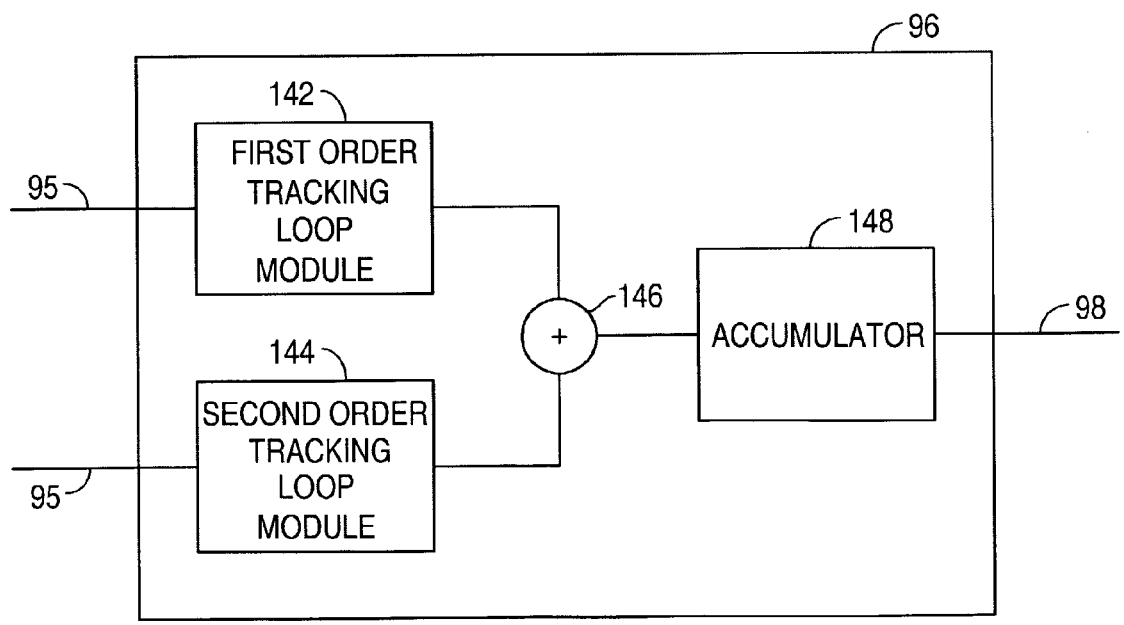
FIG. 7 is a block diagram of an exemplary frequency tracking loop module that may be employed in the apparatus shown in FIG. 5.

FIG. 7 is a block diagram of an exemplary frequency tracking module 96 that may be employed in the apparatus shown in FIG. 5. This module has a first and second error correction loop modules 142 and 144. These modules receive the processed pilot data (tracking data) 95 as described and determine a first frequency correction and second frequency correction. These corrections are summed by a summer 146 and the accumulator 148 accumulates the summed corrections to generation a frequency error correction signal 98.

Figure 8:
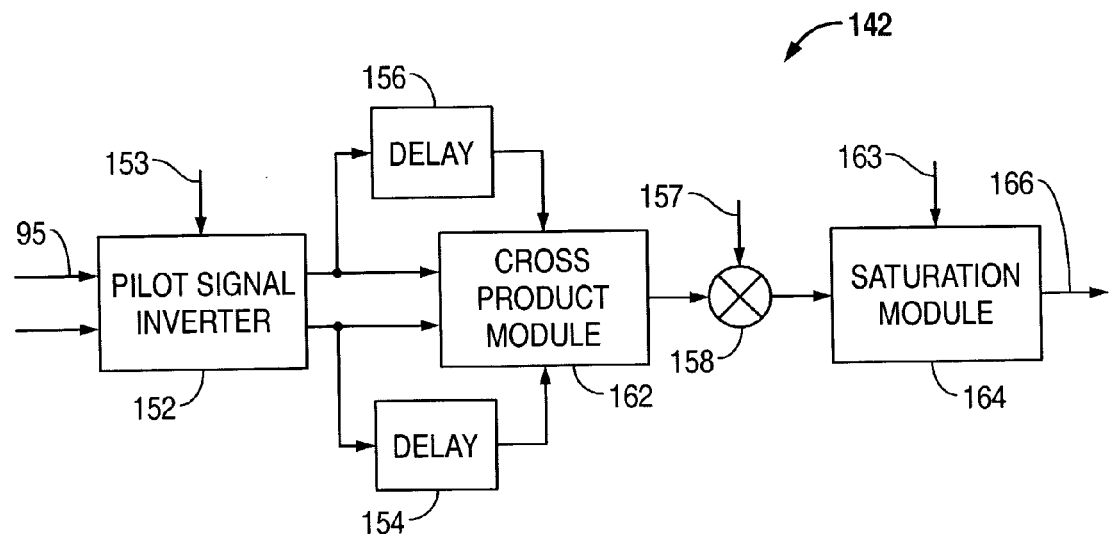
FIG. 8 is a block diagram of an exemplary first tracking loop module that may be employed in the frequency tracking loop module shown in FIG. 7.

FIG. 8 is a block diagram of an exemplary first tracking loop module 142 that may be employed in the frequency tracking loop module shown in FIG. 7. The module 142 includes cross product module 162, delays 156, 158, multiplier 158, and saturation module 164. Optionally, a pilot signal inverter 152 may be used. The pilot signal inverter 152 receives the $P_k$ (in one embodiment, in phase and quadrature) 95 and inverts the signals when an inverse signal flag 153 is set. The delay 154 store the pilot signal(s) for one cycle (slot length). The cross product module 162 determines the cross product of the pilot signal(s) for the current and previous slot. The cross product is scaled by the multiplier 158 and appropriate scale signal 157. In a preferred embodiment, the first tracking loop is limited to a maximum adjustment per slot of about +/−10 Hz. The saturation module 164 limits the adjustment based on the selected maximum signal 163.

Figure 9:
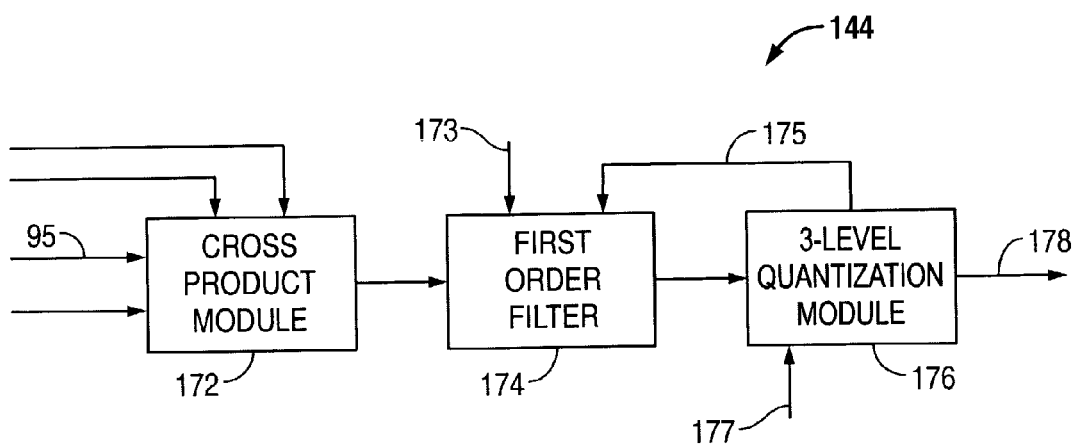
FIG. 9 is a block diagram of an exemplary second tracking loop module that may be employed in the frequency tracking loop module shown in FIG. 7.

FIG. 9 is a block diagram of one embodiment of second tracking loop module 144 that may be employed in the frequency tracking module shown in FIG. 7. The module 144 includes a cross product module, a first filter 174, and a 3-level quantization module 176. The cross product module receives $H_{1,k}$ and $H_{2,k}$ (in phase and quadrature components) and determines their cross product. The first filter 174 filters the cross product based on a filter gain signal 173. The filter may be reset by a reset signal 175. The first filter has the form y(n)=Gx(n)+(1−G)y(n−1) where y(n) is the output signal, x(n) is the input signal, and G is the gain signal 173 for the first filter 174. The three level quantization module 176 generates the second correction based on a multiple of the first loop's maximum pull-in range. The module 176 may receive a threshold signal 177 where the module 176 resets the first filter 174 (by setting the reset signal 175) based on the threshold signal 177.

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

We claim:

1. A method for determining a time domain frequency correction for a received signal having a transmission frequency, comprising:
   a) determining a first frequency correction in the time domain, the first frequency correction having a first maximum frequency pull in range, wherein the first frequency correction is a cross product of a processed pilot data and its time offset version;
   b) determining a second frequency correction having a second maximum frequency pull in range, in parallel with determining the first frequency correction, where the second frequency correction is a multiple of the first maximum frequency pull in range;
   c) determining a third frequency correction in parallel with determining the second frequency correction, where the third frequency correction is a multiple of the second maximum frequency pull in range; and
   d) summing the first frequency correction, the second frequency correction, and the third frequency correction to determine the frequency correction for the transmission frequency.

2. The method of claim 1, wherein the received signal includes a plurality of fixed-length slots.

3. The method of claim 2, wherein each slot of the plurality of fixed length slots includes pilot data.

4. The method of claim 1, further comprising adjusting the received signal transmission frequency based on the frequency correction.

5. The method of claim 1, wherein said first frequency correction is independent from said second frequency correction.

6. An apparatus for determining a time domain frequency correction for a received signal having a transmission frequency, comprising:
   a) means for determining a first frequency correction in the time domain, the first frequency correction having a first maximum frequency pull in range, wherein the first frequency correction is a cross product of a processed pilot data and its time offset version;
   b) means for determining a second frequency correction in the time domain having a second maximum pull in range, in parallel with determining the first frequency correction, where the second frequency correction is a multiple of the first maximum frequency pull in range;
   c) means for determining a third frequency correction in parallel with determining the second frequency correction, where the third frequency correction is a multiple of the second maximum frequency null in range; and
   d) means for summing the first frequency correction, the second frequency correction, the third frequency correction to determine the frequency correction for the transmission frequency.

7. The apparatus of claim 6, wherein the received signal includes a plurality of fixed-length slots.

8. The apparatus of claim 7, wherein each slot of the plurality of fixed-length slots includes pilot data.

9. The apparatus of claim 6, further comprising means for adjusting the received signal transmission frequency based on the frequency correction.

10. The apparatus of claim 6, wherein said first frequency correction is independent from said second frequency correction.

11. The method of claim 1, wherein said third frequency correction is independent from said first and second frequency corrections.

12. The apparatus of claim 6, wherein said third frequency correction is independent from said first and second frequency corrections.

* * * * *

UNITED STATES PATENT AND TRADEMARK OFFICE
CERTIFICATE OF CORRECTION

PATENT NO.         : 7,751,508 B2                                    Page 1 of 1
APPLICATION NO.    : 10/309545
DATED              : July 6, 2010
INVENTOR(S)        : Tian et al.

It is certified that error appears in the above-identified patent and that said Letters Patent is hereby corrected as shown below:

Column 7, line 16, claim 6: "null in range;" to read as --pull in range;--

Column 7, line 18, claim 6: "the third frequency" to read as --and the third frequency--

Signed and Sealed this
Twenty-ninth Day of May, 2012

David J. Kappos
*Director of the United States Patent and Trademark Office*